United States Patent
Saccomanno

(10) Patent No.: US 6,443,585 B1
(45) Date of Patent: Sep. 3, 2002

(54) HOLLOW CAVITY LIGHT GUIDE FOR THE DISTRIBUTION OF COLLIMATED LIGHT TO A LIQUID CRYSTAL DISPLAY

(75) Inventor: Robert J. Saccomanno, Montville, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/841,142

(22) Filed: Apr. 24, 2001

Related U.S. Application Data

(60) Provisional application No. 60/199,636, filed on Apr. 25, 2000.

(51) Int. Cl.[7] ................................................ F21V 7/04
(52) U.S. Cl. .......................... 362/31; 362/19; 362/561; 362/26; 385/901; 359/62
(58) Field of Search ...................... 362/19, 31, 551, 362/560, 561, 26; 385/133, 901, 11, 31, 123; 349/65; 359/62

(56) References Cited

U.S. PATENT DOCUMENTS

| | | | |
|---|---|---|---|
| 3,816,237 A | 6/1974 | Barrall | 161/227 |
| 4,260,220 A | 4/1981 | Whitehead | 350/96.28 |
| 4,373,065 A | 2/1983 | Prest | 525/132 |
| 4,737,896 A | 4/1988 | Mochizuki | 362/301 |
| 4,798,448 A | 1/1989 | Van Raalte | 350/345 |
| 4,941,074 A | 7/1990 | DeCosse | 362/61 |
| 4,984,144 A | 1/1991 | Cobb | 362/339 |
| 5,054,885 A | 10/1991 | Melby | 359/618 |
| 5,110,514 A | 5/1992 | Soane | 264/22 |
| 5,178,447 A | 1/1993 | Murase | 362/31 |
| 5,235,443 A | 8/1993 | Barnik | 359/37 |
| 5,243,506 A | 9/1993 | Whitehead | 362/307 |
| 5,303,322 A | 4/1994 | Winston | 385/146 |
| 5,359,691 A | 10/1994 | Tai | 385/146 |
| 5,381,309 A | 1/1995 | Borchardt | 362/31 |
| 5,396,350 A | 3/1995 | Beeson | 359/40 |
| 5,587,816 A | 12/1996 | Gunjima | 349/62 |
| 5,594,830 A | * 1/1997 | Winston et al. | 385/146 |
| 5,828,488 A | 10/1998 | Ouderkirk | 359/487 |
| 5,854,872 A | 12/1998 | Chen-Yu Tai | 385/133 |
| 5,962,114 A | 10/1999 | Jonza | 428/212 |
| 5,982,540 A | * 11/1999 | Koike et al. | 359/487 |
| 6,010,747 A | 1/2000 | Beeson | 427/162 |
| 6,024,462 A | 2/2000 | Whitehead | 362/31 |
| 6,079,844 A | 6/2000 | Whitehead | 362/97 |
| 6,082,861 A | 7/2000 | Dove | 353/20 |
| 6,104,454 A | * 8/2000 | Hiyama et al. | 349/65 |
| 6,151,142 A | 11/2000 | Phillips | 359/3 |
| 6,155,692 A | * 12/2000 | Ohkawa | 362/31 |
| 6,188,460 B1 | 2/2001 | Faris | 349/176 |

OTHER PUBLICATIONS

Society for Information Display, International Symposium Digest of Technical Papers, vol. XXX, May 18–20, 1999, p. 916.
1999 SID International Symposium Digest of Technical Papers, May, 1999 p. 714–.

* cited by examiner

*Primary Examiner*—Sandra O'Shea
*Assistant Examiner*—Ali Alavi
(74) *Attorney, Agent, or Firm*—Lori B. Yeadon

(57) ABSTRACT

An optical light guide comprising optical elements enclosing a hollow cavity is configured to uniformly distribute homogenized collimated light to a liquid crystal display. The optical light guide includes a beam splitting structure covering the entrance aperture of the light guide, a retarder and specular reflector on the face of the light guide opposite the entrance aperture, an exit aperture orthogonal to the entrance aperture with a reflective polarizer and a beam directing structure over the exit aperture, and a specular reflector on the bottom of the light guide opposite the exit aperture.

17 Claims, 4 Drawing Sheets

HOLLOW CAVITY LIGHT GUIDE FOR THE DISTRIBUTION OF COLLIMATED LIGHT TO A LIQUID CRYSTAL DISPLAY

CROSS-REFERENCE TO RELATED APPLICATIONS

This application claims priority from U.S. Provisional Patent Application Serial No. 60/199,636 entitled, "Air Waveguide', filed on Apr. 25, 2000. The contents of U.S. Provisional Patent Application Serial No. 60/199,636 are fully incorporated herein by reference.

FEDERALLY SPONSORED RESEARCH OR DEVELOPMENT

Not Applicable

BACKGROUND OF THE INVENTION

1. Technical Field

This invention relates to uniformly distributing collimated light for information display, illumination, and direct lighting applications.

2. Background Art

It has long been a goal to develop large flat displays such as large screen television sets for consumer use. The expected performance for such displays is that they meet or exceed the performance of the well-known cathode ray tube (CRT) television (TV) display. This expected performance can include, for example, a wide viewing angle—with the present day CRT technology, a viewer can sit almost anywhere relative to the TV screen and experience essentially the same picture quality. This CRT quality level is typically inherent in both projection and emissive, such as plasma display, technologies.

Wall-mounted TV sets with large area plasma displays have been introduced into the consumer market. These plasma displays are relatively thin, typically less than five (5) inches (12.7 cm) thick, and have CRT-like viewing angles. However, large are plasma displays are currently too expensive for large-scale consumer use and tend to be of lower resolution than competing display technologies.

Projection displays require an unimpeded path between the projector and a screen. Backscreen projection displays typically include a large enclosure containing the projector, relay optics and a translucent screen. Because of these limitations, both types of projection displays are considered undesirable for large-scale consumer use.

Direct view liquid crystal displays, which are reasonably inexpensive to manufacture, are beginning to be introduced into the consumer TV set market. However, a typical liquid crystal display (LCD), such as a twisted-nematic LCD (TN-LCD) found in a typical laptop computer cannot normally provide the wide viewing angle expected by the consumer for a TV set. Several methods have been employed to widen the viewing angle of an LCD display and to also limit the overall thickness of an enclosure so that such a display could be used as a wall-mounted TV.

A typical approach to lighting an LCD display is to position a solid edge-illuminated light guide behind the LCD display. Collimation is known to improve the viewing angle of an LCD display when used in combination with a viewing screen applied to the output polarizer of the LCD display. It is also important to minimize surface reflections from the combination of viewing screen and LCD in order to provide sufficient readability in ambient lighting conditions. Previous attempts to minimize such reflections include the use of neutral density filters, triple notch filters, and circular polarizers.

There are several disadvantages associated with the use of solid edge-illuminated light guides as known in the art including the weight of such light guides and a decrease in light transmittance due to bulk material effects such as absorption and haze. For example, a solid glass light guide that would provide a 40-inch (101.6 cm) diagonal display the same luminance that a 10.4-inch (26.4 cm) diagonal display light guide would receive from a 6-millimeter thick solid glass light guide weighing 0.5 lb. (0.23 kg), would be 23-millimeter thick and weigh approximately 30 lb. (13.6 kg). Some optical glass exhibits light absorption losses as low as 0.002%/cm, while many optical plastics are closer to 0.10%/cm. It is worthy to note that this light absorption loss is not constant with wavelength, and therefore there is a corresponding change in the spectrum of the output light for a solid light guide device.

Previous attempts at both hollow and semi-hollow edge-illuminated collimated light guides have suffered from a non-uniform light output. Attempts to correct this non-uniformity including curving the extraction surface, employing very long extraction lengths, and tilting the centerline of collimated light source away from a light guide exit surface have met with varying degrees of success.

There is a need for an efficient and compact hollow edge-illuminated light guide for the distribution of collimated light to a liquid crystal display (LCD) that provides a uniform light output.

SUMMARY OF THE INVENTION

Disclosure of Invention

My invention comprises a method and apparatus for distributing collimated light and may be employed in lighting applications to enhance viewing angles of a wide angle Liquid Crystal Display (LCD). It can also be employed to distribute collimated light for other direct-lighting applications. More specifically, my invention is a light guide comprising a unique configuration of a hollow cavity surrounded by various optical films that receives collimated light through an entrance aperture and transmits the light uniformly from an exit aperture that is orthogonal to the entrance aperture. Advantageously the input light is both collimated and homogenized.

A significant advantage to the inventive hollow light guide is that any size guide can be assembled using the same microstructured parts and specular reflectors, so long as the collimation elements, such as morphing elements are the same.

BRIEF DESCRIPTION OF THE SEVERAL VIEWS OF THE DRAWING

Brief Description of Drawings

Figure 1:
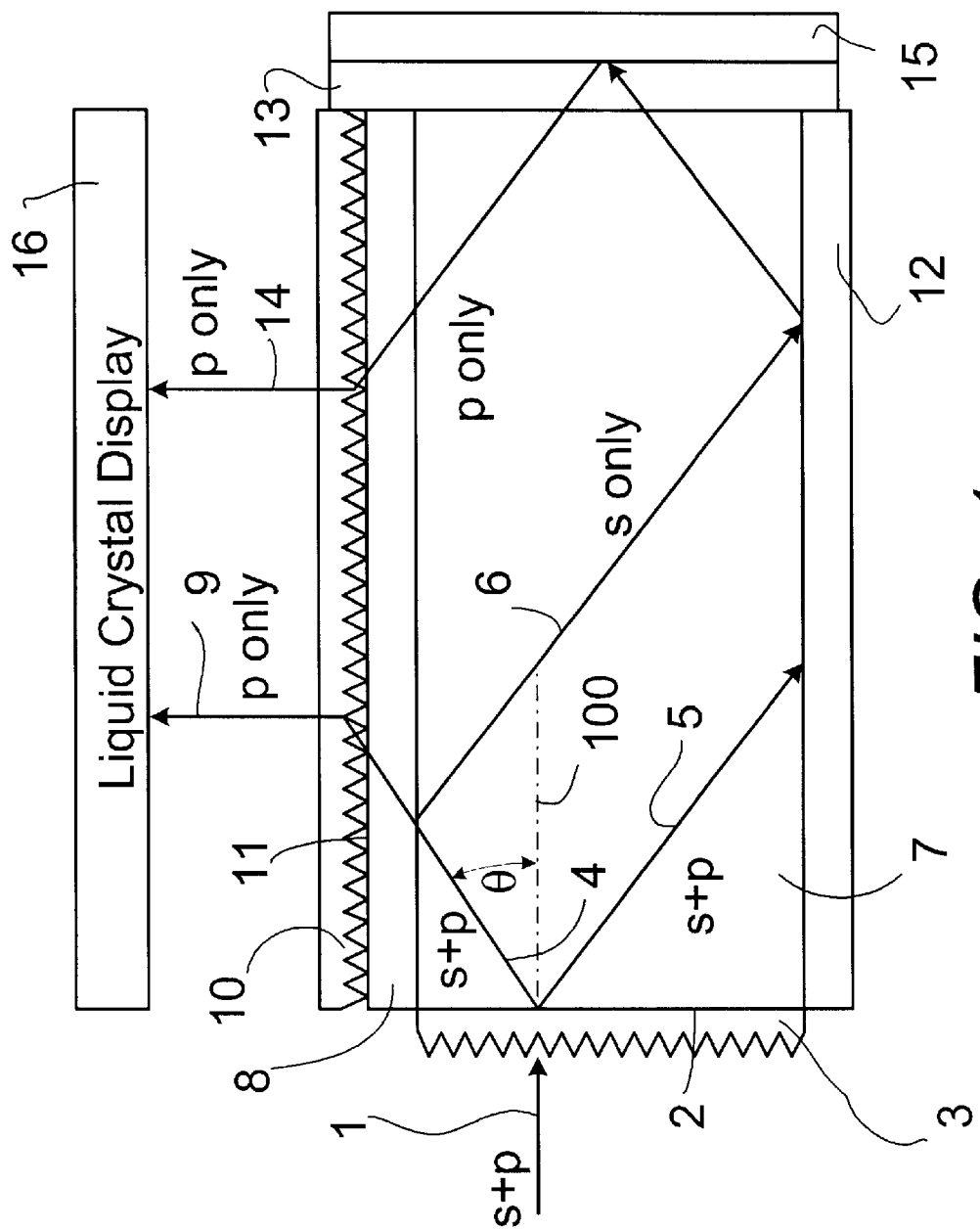

FIG. 1 depicts a single-edge-coupled, polarized, hollow light guide in accordance with the present invention and detailing the extraction method for an upper light lobe.

Figure 2:
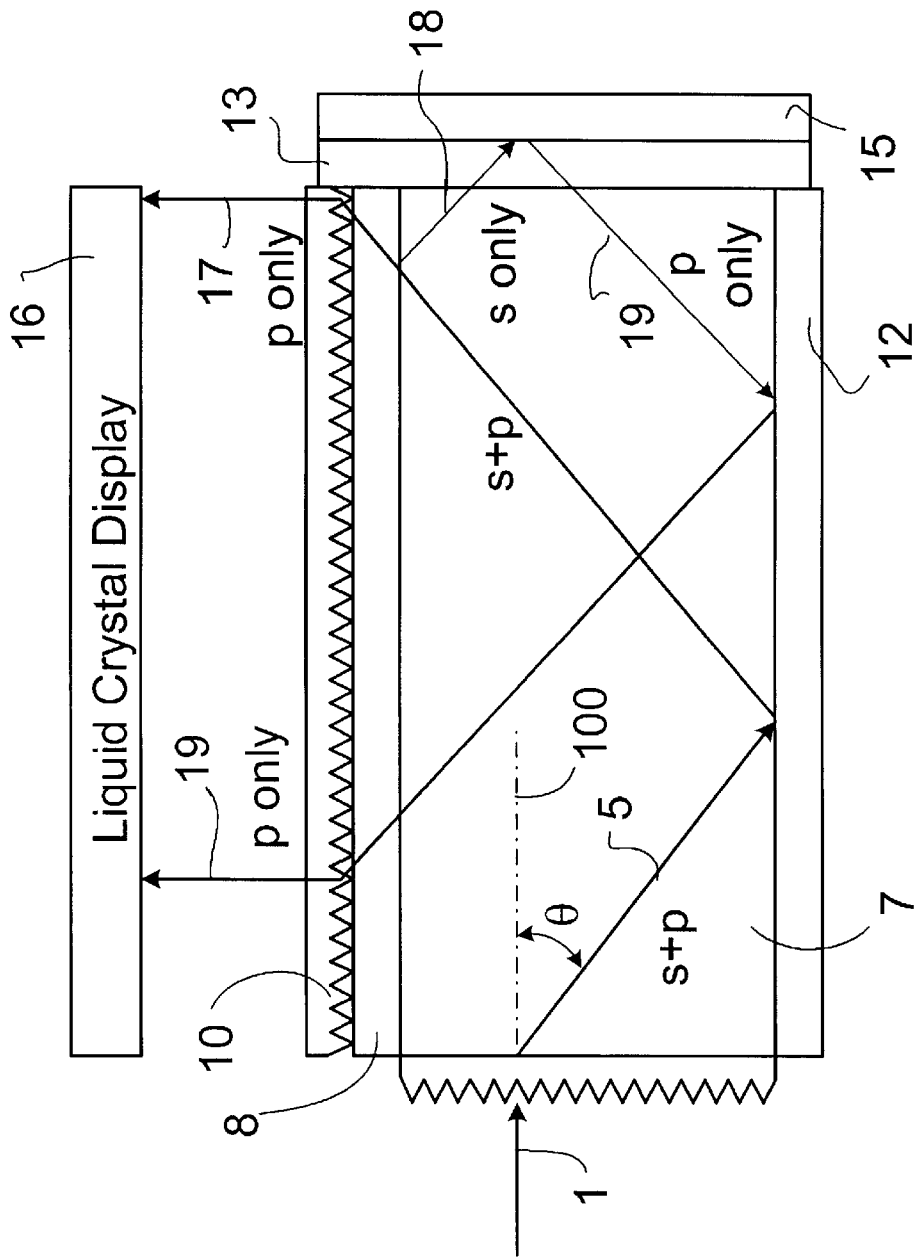

FIG. 2 depicts the hollow light guide of FIG. 2, detailing the extraction method for a lower light lobe.

Figure 3:
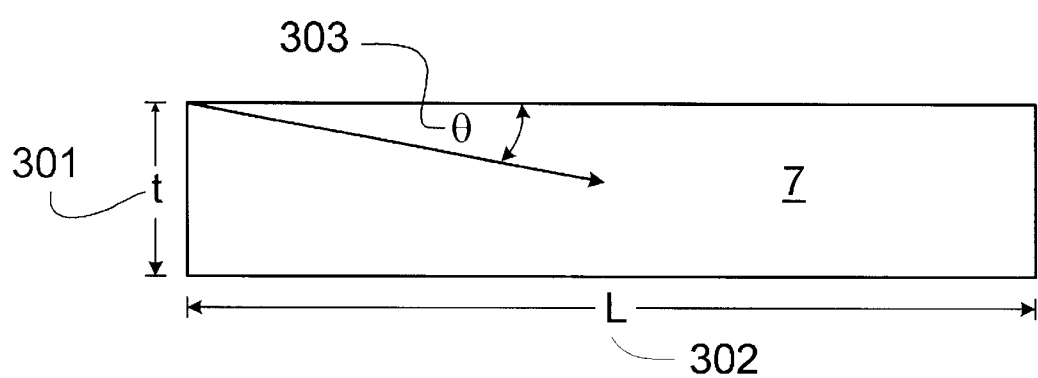

FIG. 3 shows the geometric relationship between the thickness and length of the hollow light guide of FIGS. 1 and 2.

Figure 4:
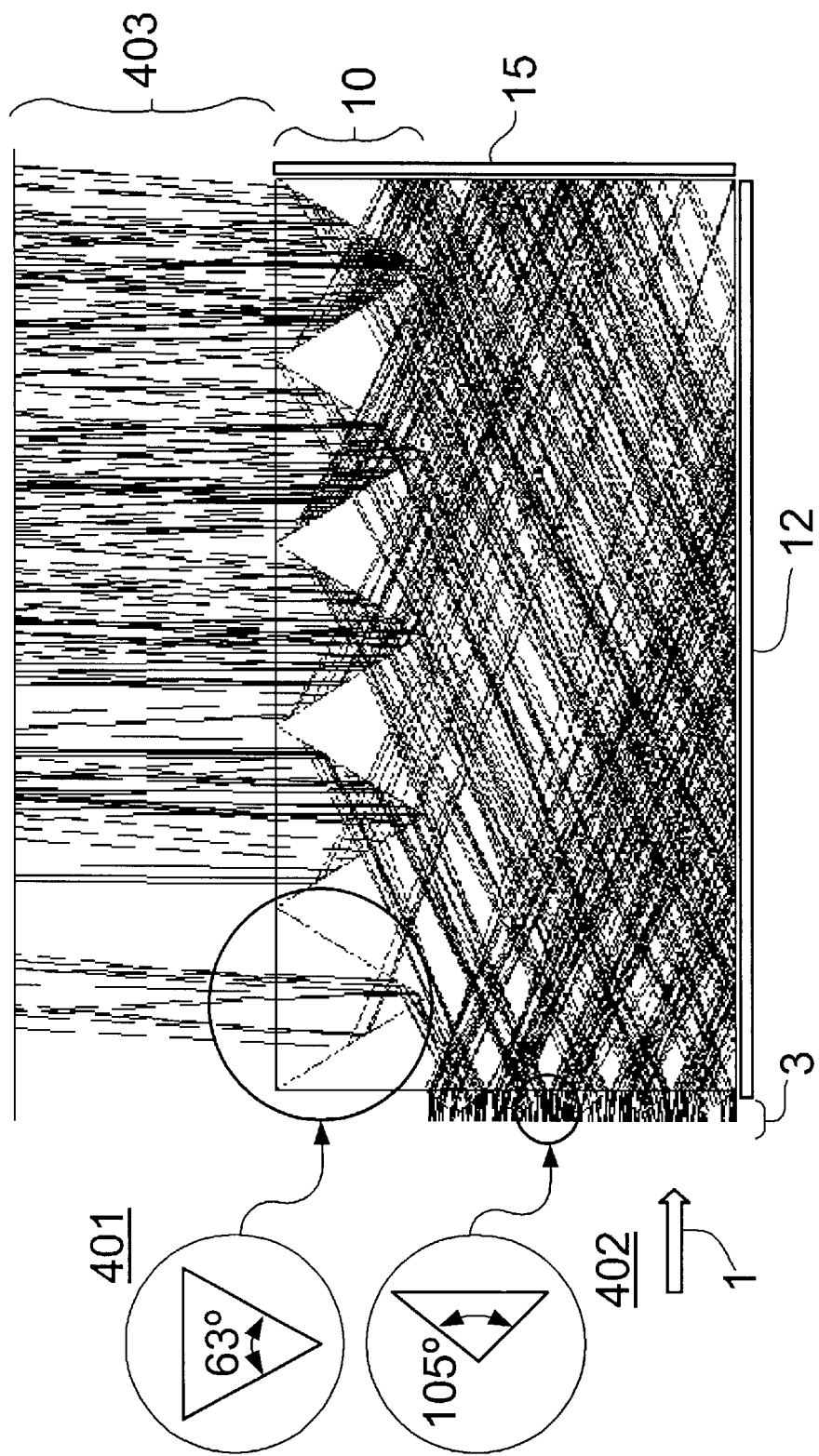

FIG. 4 shows the results of ray-trace modeling for the extraction mechanism of FIGS. 1 and 2.

DETAILED DESCRIPTION OF THE INVENTION

Mode(s) for Carrying Out the Invention

Referring to FIG. 1, the principle of operation of an LCD display 16 is to preferentially pass light that has been linearly polarized along a predefined axis. My invention accepts collimated homogenized light containing both s-polarized and p-polarized components through an entrance aperture 2 as shown in FIG. 1 and outputs light containing only a p-polarized component through exit aperture 11. If the axis of the p-polarized component is not aligned with that of the LCD display 16, a retarder, available for example from NittoDenko or International Polarizer, can be inserted between the exit aperture 11 and the LCD display 16 in order to improve efficient transfer of light therebetween. Phase correction members can be employed to further enhance contrast.

The hollow light guide, according to my invention, is formed by enclosing a hollow cavity 7 with optical films. The hollow cavity 7 is configured as a parallelepiped that includes a first set of parallel faces consisting of an entrance aperture 2 and an opposing distal edge, a second set of parallel faces consisting of a bottom edge and an exit aperture 11, and a third set of parallel faces defining the sides (not shown). A reference plane 100, extending through and perpendicular to the entrance aperture 2 and parallel the exit aperture 11 is illustrated for reference purposes in FIGS. 1 and 2. One feature of my invention is that the exit aperture 11 is orthogonal to the entrance aperture 2 and the third set of parallel faces.

The entrance aperture 2 is covered by a beam splitting structure 3; such as a prismatic array film which can be similar in shape to Brightness Enhancement Film (BEF) manufactured by the 3M Corporation. In an embodiment of my invention where the beam splitting structure 3 comprises a prismatic array film, a planar side of this prismatic array film faces the hollow cavity 7. The beam splitting structure 3 is configured to symmetrically split an incoming beam of homogenized collimated light 1 into an upper beam lobe 4 and a lower beam lobe 5, where the upper and lower beam lobes diverge in opposing directions on either side of the reference plane 100 by an angle $\theta$. In is one aspect of my invention that the magnitude of the angle $\theta$ formed between the upper beam lobe 4 and the reference plane 100 is of the same magnitude as the angle $\theta$ formed between the reference plane 100 and the lower beam lobe 5.

The distal edge of the hollow cavity 7 is formed by a retarder 13 disposed upon a first specular reflector 15. The bottom edge of the hollow cavity 7 is formed by a second specular reflector 12. The third set of parallel faces (not shown) are each also formed by specular reflectors.

The exit aperture 11 is covered by a reflective polarizer 8 adjacent to a beam directing structure 10 including coarse prismatic features, such as a prismatic array film. In an embodiment of my invention where the beam directing structure 10 comprises a prismatic array film, a planar side of this prismatic array film faces away from the hollow cavity 7. In order to preserve the light polarization state, the beam directing structure 10 should be manufactured in such a fashion and of such polymers as to substantially reduce any birefringence properties. Suitable materials are available from the eyeglass industry, such as CR-39 allyl diglycol carbonate resin from PPG Industries, and the compact disk industry, such as Plexiglas VOD-100 acrylic molding resin from ATOFINA Chemicals, Inc.

The reflective polarizer 8 may be constructed out of suitable materials such as multi-layer polymeric films, grazing incidence holograms, and cholesteric liquid crystal films.

In order to maintain light collimation within hollow cavity 7, it is necessary to maintain the orthogonality and flatness of the bounding optical surfaces. Accordingly, these optical film surfaces require structural supporting members. The surfaces that do not transmit light can be supported by glass or plastic sheet stock, further stiffened by metallic and/or honeycomb structures. The surfaces that transmit light, such as exit aperture 11 can be supported by small transparent and non-birefringent post-like elements (not shown). These transparent post-like elements are small enough in cross sectional area that they should prove invisible once the output beam reaches the LCD display 16. In another embodiment of my invention, the supporting post-like elements are light absorbing instead of being transparent.

In a preferred embodiment, a source of unpolarized light from an optical conduit is collimated by close-packed high aspect ratio non-imaging optical elements feeding into the rectangular edge of a hollow light guide. Such non-imaging optical elements could comprise an array structure built up from a plurality of round-to-square morphing elements with adjacent planar sides in optical contact, or alternatively an array of hollow triangular elements enclosed by upper and lower mirrored plates. Both array structures are advantageously designed to ensure a uniform light output. Optionally, these structures can be followed by prisms and spacers that are optically bonded using a low refractive index adhesive, to allow for various packaging constraints while still maintaining uniformity.

Advantageously, a hollow light guide according to my invention can be designed to limit several sources of light decollimation, including but not limited to:

Surface microroughness

Edge-rounding of the microstructured features induced by manufacturing processes Material bulk effects, such as scatter due to inclusions, refractive index changes (e.g. air bubbles), and the like Material warp, bend, and twist Referring to FIGS. 1 and 2, the optical light guide according to my invention operates in the following manner. An unpolarized collimated light beam 1 is received at the entrance aperture 2, which is covered by a beam splitting structure 3, such as a prismatic array film. Interactions between the unpolarized collimated light beam 1 and the beam splitting structure 3 act to symmetrically split the unpolarized collimated light beam 1 into an upper beam lobe 4 and a lower beam lobe 5, where each beam lobe contains both spolarized and p-polarized light.

The upper beam lobe 4 is directed through the hollow cavity 7 and caused to impinge upon the reflective polarizer 8. Interactions between the upper beam lobe 4 and the reflective polarizer 8 act to separate the upper beam lobe 4 into an s-polarized upper beam 6 and a p-polarized upper beam 9.

The p-polarized upper beam 9 exits through the reflective polarizer 8 into the beam directing structure 10 including coarse prismatic features, which covers the exit aperture 11. Interactions between the p-polarized upper beam 9 and the beam directing structure 10 including coarse prismatic features act to straighten the p-polarized upper beam 9 as it passes therethrough and exits through the exit aperture 11.

The s-polarized upper beam 6 is reflected back through the hollow cavity 7, caused to impinge upon the second specular reflector 12, and thereby being reflected into the retarder 13. Interactions between the s-polarized upper beam 6 and the retarder 13 act to convert the s-polarized upper beam 6 into a p-polarized converted upper beam 14 as it passes therethrough. The resultant p-polarized converted upper beam 14 is reflected from the first specular reflector 15 back through the hollow cavity 7 and caused to impinge upon the reflective polarizer 8. The p-polarized converted upper beam 14 also exits through the reflective polarizer 8 into the beam directing structure 10 including coarse prismatic features, which covers the exit aperture 11. Interactions between the p-polarized converted upper beam 14 and the beam directing structure 10 including coarse prismatic features act to straighten the p-polarized converted upper beam 14 as it passes therethrough and exits through the exit aperture 11.

The lower light beam lobe 5 is directed through the hollow cavity 7 and caused to impinge upon the second specular reflector 12. The lower light beam lobe 5, which contains both s-polarized and p-polarized light must be precluded from impinging upon the retarder 13 disposed on the distal edge of the hollow cavity 7.

The lower beam lobe 5 is reflected from the second specular reflector 12 back through the hollow cavity 7 and caused to impinge upon the reflective polarizer 8, as seen in FIG. 2. Interactions between the lower beam lobe 5 and the reflective polarizer 8 act to separate the lower beam lobe 5 into an s-polarized lower beam 18 and a p-polarized lower beam 17.

The p-polarized lower beam 17 also exits through the reflective polarizer 8 into the beam directing structure 10, which covers the exit aperture 11. Interactions between the p-polarized lower beam 17 and the beam directing structure 10 act to straighten the p-polarized lower beam as it passes therethrough and exits through the exit aperture 11.

The s-polarized lower beam 18 is reflected back through the hollow cavity 7, caused to impinge upon the second specular reflector 12, and thereby being reflected into the retarder 13. Interactions between the s-polarized lower beam 18 and the retarder 13 act to convert the spolarized lower beam 18 into a p-polarized converted lower beam 19 as it passes therethrough. The resultant p-polarized converted lower beam 19 is reflected from the first specular reflector 15 back through the hollow cavity 7, further reflected from the specular reflector 12, and finally caused to impinge upon the reflective polarizer 8. The p-polarized converted lower beam 19 also exits through the reflective polarizer 8 into the beam directing structure 10, which covers exit aperture 11. Interactions between the p-polarized converted lower beam 19 and the beam directing structure 10 act to straighten the p-polarized converted lower beam 19 as it passes therethrough and exits through the exit aperture 11.

It is a feature of my invention that substantially all of the input unpolarized collimated light beam 1 is converted to p-polarized light and exits through exit aperture 11 with substantially none of input unpolarized collimated light beam 1 being recycled back through entrance aperture 2.

FIG. 3 shows some of the design considerations that are associated with the particular embodiment of my invention described above. As shown in FIGS. 1 and 2, the hollow cavity 7 is configured as a parallelepiped with the entrance aperture 2 orthogonal to the exit aperture 11. Referring to FIG. 3, the light guide thickness 't' 301, of the hollow cavity 7, is dependent on both luminance, as limited by entendue considerations, and mechanical packaging constraints. The light guide length 'L' 302, of the hollow cavity 7, is determined by the area to be illuminated, such as an LCD display. The input beam lobe angle 'θ' 303, measured from an axis line perpendicular to said entrance aperture 2, also shown as a dashed line on FIGS. 1 and FIG. 2, is selected to provide output beam uniformity. The input beam lobe angle 'θ' 303 is restricted to certain angles due to the inherent limitations in the beam splitting structure 3 and the beam directing structure 10.

Referring to FIGS. 1, 2, and 3, it is an aspect of my invention that the combination of t, L, and θ, be selected such that the lower light beam lobe 5, which contains both s-polarized and p-polarized light, is precluded from being reflected into the retarder 13 without first being separated into p-polarized and s-polarized component beams, for example by reflective polarizer 8.

To practice the particular embodiment of my invention described above, input beam divergence and microstructural element geometry will require adjustments to t and θ, where Tan θ=t/L, to ensure uniformity of the output the p-polarized upper beam 9, p-polarized converted upper beam 14, p-polarized lower beam 17, and p-polarized converted lower beam 19 as well as overall light guide efficiency. Mathematical analysis and ray tracing methods that are known in the art can be used to determine these adjustments.

Referring next to FIG. 4, the results of ray-trace modeling for the extraction mechanism of FIGS. 1 and 2 is shown. Surface detail 402 shows an example prism element, greatly enlarged for illustrative purposes, with a refractive index of 1.58 and an apical angle of about 105°, which can form a portion of the surface of the beam splitting structure 3, comprising a prismatic array film, in accordance with one illustrative embodiment of my invention. Surface detail 401 shows an example prism element, greatly enlarged for illustrative purposes, with a refractive index of 1.58 and an apical angle of about 63°, which can comprise a portion of the surface of the beam directing structure 10, comprising a prismatic array film, in accordance with one illustrative embodiment of my invention. The reflective polarizer 8, adjacent to the beam directing structure 10, as shown in FIG. 1 is advantageously a multi-layer polymeric film, grazing incidence hologram, or cholesteric liquid crystal film. The individual ray traces 403 are shown interacting with the beam splitting structure 3, beam directing structure 10, first specular reflector 15, and the second specular reflector 12.

Referring to both FIGS. 1 and 4, the unpolarized collimated light beam 1, for example having a source input convergence half-angle of 7° is shown being split by the beam splitting structure 3 which includes a surface detail 402 further including a prism element with an apical angle of about 105°. Interactions between the unpolarized collimated light beam 1 and the beam splitting structure 3 act to split the unpolarized collimated light beam 1 into an upper beam lobe 4 as previously described. Interactions between the upper beam lobe 4 and the reflective polarizer 8, which includes a surface detail 401 further including a prism element with an apical angle of about 63°, act to separate the upper beam lobe 4 into s-polarized and p-polarized beams as previously described.

Referring to both FIGS. 2 and 4, interactions between the lower beam lobe 5 and the reflective polarizer 8, which includes a surface detail 401 further including a prism element with an apical angle of about 63°, act to separate the lower beam lobe 5 into s-polarized and p-polarized beams as previously described.

In alternate embodiments of my invention, the hollow cavity 7 may be a vacuum chamber, or filled with air, dry nitrogen, or an inert gas.

In a preferred embodiment of the invention, each of the p-polarized upper beam 9, p-polarized converted upper beam 14, p-polarized lower beam 17, and p-polarized converted lower beam 19 are directed toward the liquid crystal display 16.

In another preferred embodiment of my invention, light is transmitted from an optical conduit, such as an optical fiber and collimated by an array of tapered non-imaging optical collimation elements before entering the entrance aperture 2. Advantageously, such collimation elements have a square cross section at their output, allowing adjacent elements to be easily abutted, and also homogenize the light before it enters the entrance aperture 2.

Alternate embodiments may be devised without departing from the spirit or the scope of the invention.

What is claimed is:

1. A hollow light guide for uniformly distributing homogenized collimated light, said light guide comprising:
   a hollow cavity configured as a parallelepiped and further comprising,
   a first set of parallel faces consisting of an entrance aperture and a distal edge located a first predetermined distance in opposition thereof, and
   a second set of parallel faces consisting of a bottom edge and an exit aperture located a second predetermined distance in opposition thereof, said exit aperture being orthogonal to said entrance aperture;
   wherein said hollow cavity configured as a parallelepiped is further defined by a reference plane extending through and perpendicular to said entrance aperture and parallel to said exit aperture;
   a beam splitting structure covering said entrance aperture and configured to symmetrically split, about said reference plane, an incoming beam of said collimated light striking thereupon into an upper beam lobe and a lower beam lobe exiting therefrom said beam splitting structure into said hollow cavity,
   wherein said upper beam lobe diverges in a first direction from said reference plane and said lower beam lobe diverges in a second direction from said reference plane, said first direction directly opposing said second direction;
   a retarder adjacent to a first specular reflector and forming together therewith said distal edge of said hollow cavity, wherein said retarder is interposed between the interior of said hollow cavity and said first specular reflector;
   a second specular reflector forming said bottom edge of said hollow cavity and being geometrically positioned such that none of the lower light beam lobe is reflected therefrom to impinge upon the retarder; and
   a reflective polarizer adjacent to a beam directing structure and covering together therewith said exit aperture of said hollow cavity, wherein said reflective polarizer is interposed between the interior of said hollow cavity and said beam directing structure.

2. The hollow light guide according to claim 1 wherein said beam directing structure includes coarse prismatic features.

3. The hollow light guide according to claim 1 wherein said beam splitting structure comprises a prismatic array film including a planar side wherein said planar side of said prismatic array film faces the hollow cavity.

4. The hollow light guide according to claim 3 wherein said prismatic array film includes a plurality of prism elements each having an apical angle of about 105°.

5. The hollow light guide according to claim 2 wherein said beam directing structure further comprises a prismatic array film including a planar side wherein said planar side of said prismatic array film faces away from the hollow cavity.

6. The hollow light guide according to claim 5 wherein said prismatic array film including a plurality of prism elements each having an apical angle of about 63°.

7. The hollow light guide according to claim 1 wherein said reflective polarizer is constructed from a material selected from the group consisting of multi-layer polymeric films, grazing incidence holograms, and cholesteric liquid crystal films.

8. The hollow light guide according to claim 1 wherein said hollow cavity is a vacuum chamber.

9. The hollow light guide according to claim 1 wherein said hollow cavity is filled with dry nitrogen.

10. The hollow light guide according to claim 1 wherein said hollow cavity is filled with an inert gas.

11. A display system, using an unpolarized collimated light input, comprising the hollow light guide of claim 1 and further comprising:
    a liquid crystal display positioned opposite said exit aperture of said hollow cavity.

12. A source of uniformly distributed polarized light, using an unpolarized light input from an optical conduit, comprising the hollow light guide of claim 1 and further comprising:
    a plurality of tapered non-imaging optical collimation elements that receive said light input and transmit collimated light to the entrance aperture of said hollow light guide.

13. The hollow light guide according to claim 1 wherein said first predetermined distance is a length L, said second predetermined distance is a thickness t, and said upper beam lobe and said lower beam lobe each diverge from said reference plane at a angle $\theta$, and wherein t is substantially equal to $L * \tan \theta$.

14. An optical waveguide for distributing collimated light to a display, said waveguide having:
    a first face including an entrance aperture for the light and a beam splitting structure covering said entrance aperture;
    a second face opposite said first face an comprising a retarder and a first specular reflector;
    a third face including an exit aperture, said third face being orthogonal to said first and second faces and comprising a beam directing structure and a reflective polarizer covering the exit aperture; and
    a fourth face opposite said exit aperture and including a second specular reflector.

15. The optical waveguide of claim 14 wherein said beam directing structure includes coarse prismatic features.

16. The optical waveguide of claim 14 wherein said light guide is a hollow cavity configured as a parallelepiped.

17. The optical light guide of claim 14 wherein said light guide has a thickness t and a length L and wherein light entering said light guide from said entrance aperture through said beam splitting structure is split into an upper and a lower lobe, and wherein:
    each of said upper lobe and said lower lobe containing both s-polarized light and p-polarized light;
    the lower lobe being at an angle $\theta$ to an axis line of said light guide; and
    wherein the magnitudes of t, L, and $\theta$ are selected to determine that said lower lobe is precluded from being reflected from said second face without being first separated into its p-polarized and s-polarized component beams.

* * * * *